United States Patent Office 3,006,217
Patented Oct. 31, 1961

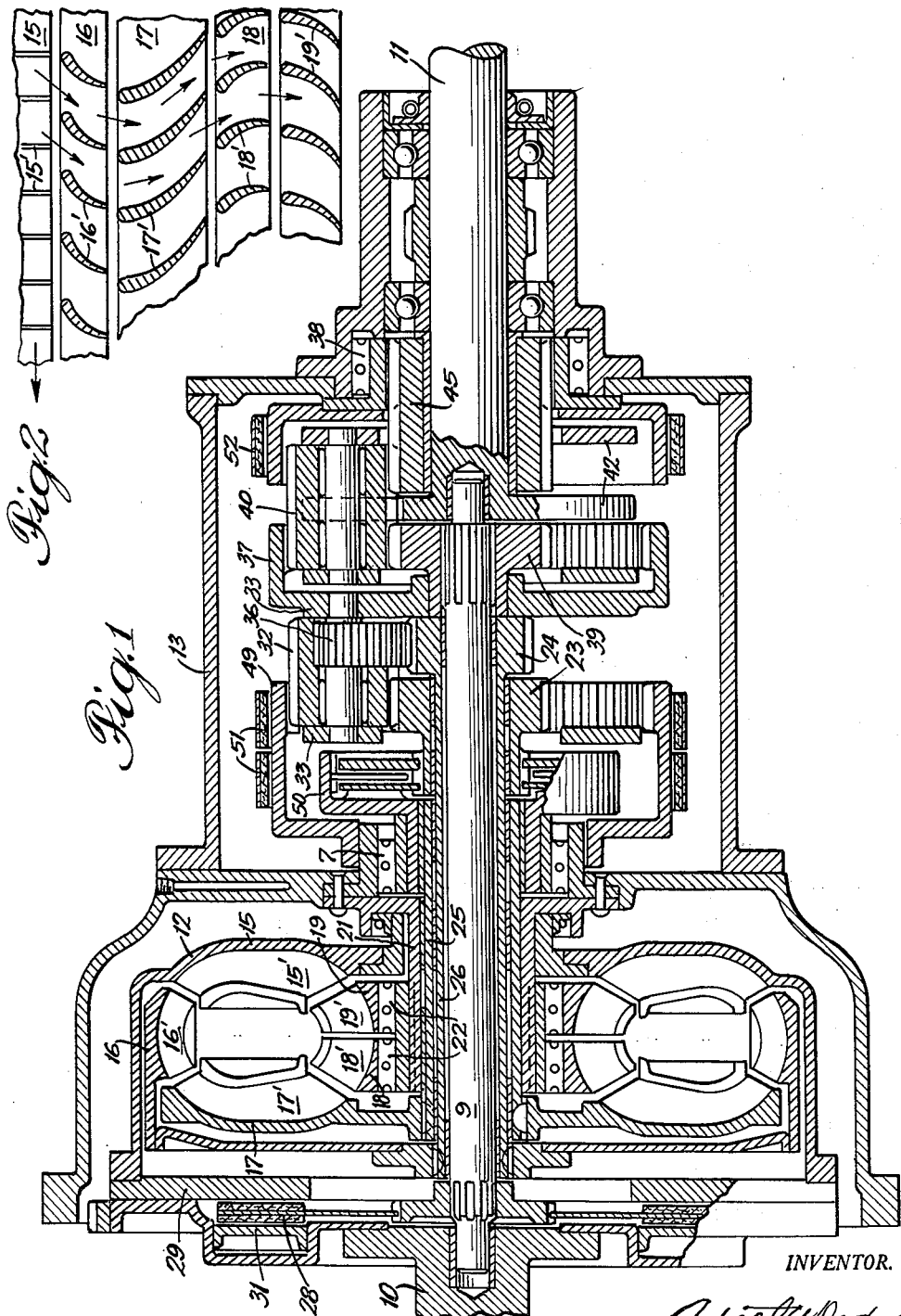

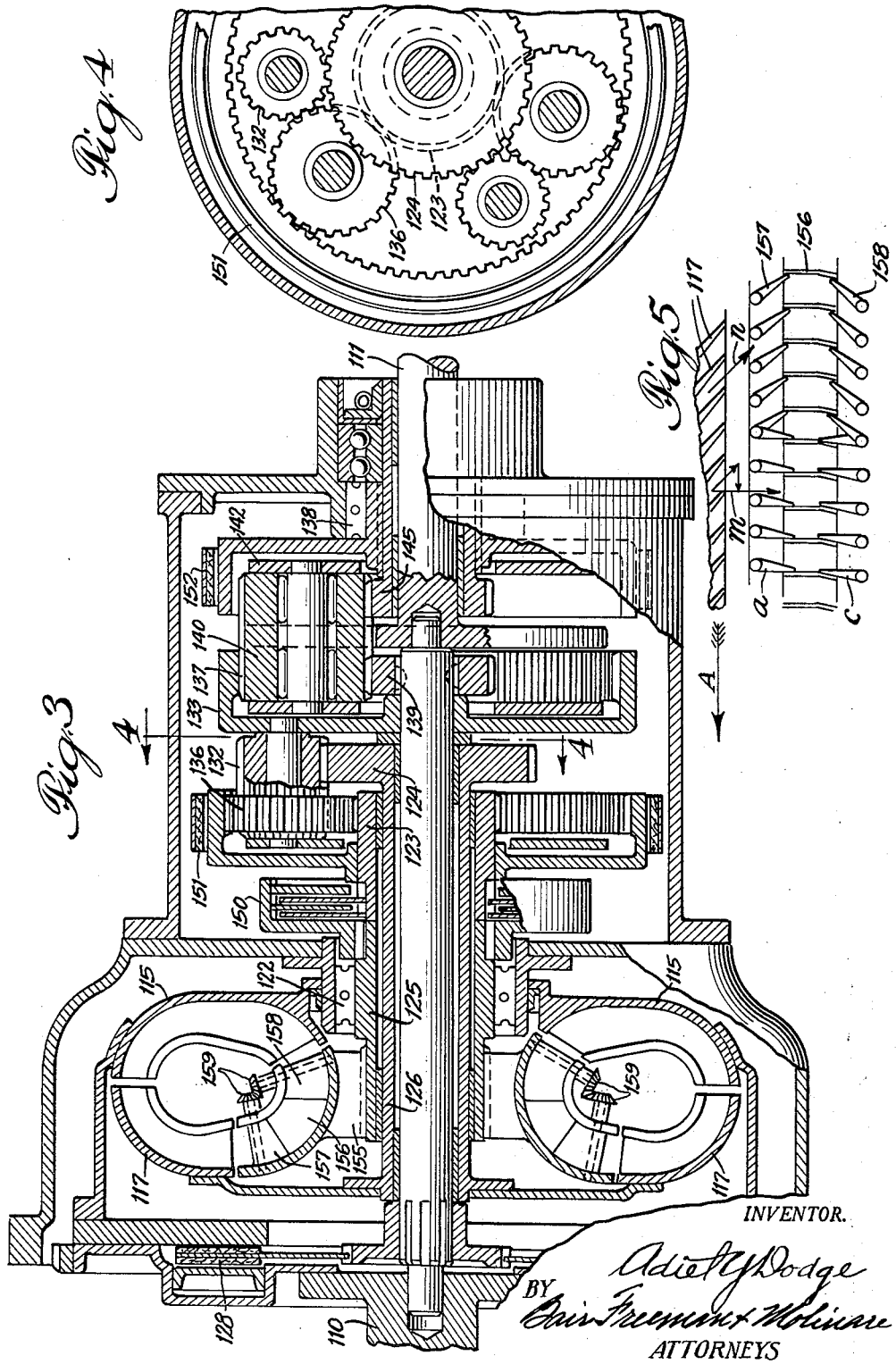

3,006,217
TRANSMISSION
Adiel Y. Dodge, % A. Y. Dodge Co., 206 S. Main St., Rockford, Ill.
Filed Sept. 16, 1957, Ser. No. 684,342
1 Claim. (Cl. 74—688)

This invention relates to transmissions and more particularly to a combined hydrokinetic and gear transmission of a type suitable for use on automotive vehicles.

One of the objects of the invention is to provide a transmission including a hydraulic torque converter of the type having two driven rotors or turbines in which the drive from the two rotors is combined differentially through a simple set of gearing.

According to one feature, the gearing includes two sun gears connected respectively to the two driven rotors and meshing, one directly and the other through an idler gear, with planet pinions on a carrier which is connected to the load.

Another object of this invention is to provide a transmission in which the major shifts are made through the action of the hydraulic fluid in the hydrokinetic fluid drive. Such shifts are inherently automatic and extremely smooth—smoother than may be accomplished by engaging and disengaging friction clutches.

According to a feature of the invention one ratio change is made by engaging and disengaging a friction clutch which transmits only a fraction of the total horsepower so that it may be operated with a minimum of shock.

Another object of this transmission is to provide a twin turbine torque converter having a major and minor turbine.

Another object of this invention is to provide a three-element torque converter in which the third element or stator acts as a secondary turbine after it has ceased to act as a stator.

According to a feature of the invention the vanes of such third element change their contour automatically to function efficiently as either a stator or secondary turbine.

Another object of this invention is to provide a suitable gear arrangement which will provide two mechanical gear reaction members and also provide two input pinions differentially opposed, each driven by a turbine member and also provide a two path power flow in the higher speed range.

Another object is to provide means in the gear arrangement such that the vehicle may be retarded against the descending of hills and also in which the engine may be started by pushing the vehicle.

The above and other objects and features of this invention will be more readily apparent from the following description when read in connection with the accompanying drawings, in which:

FIGURE 1 is an axial section with parts in elevation of a transmission embodying the invention;

FIGURE 2 is a developed view of the vanes of the torque converter of FIGURE 1;

FIGURE 3 is a section with parts in elevation of an alternative transmission embodying the invention;

FIGURE 4 is a partial cross section on line 4—4 of FIGURE 3 partly diagrammatic in form; and FIGURE 5 diagrammatically illustrates the arrangement of pivoted vanes in the third element of the torque converter shown in FIGURE 3.

The transmission, as shown, is adapted to connect a driving shaft 10, which may be an engine crankshaft or an extension thereof, to a driven shaft 11, which may be connected through the usual differential to driving wheels of a vehicle. The driving shaft drives a hydraulic torque converter, indicated generally at 12, which drives through a first differential gear set enclosed in the casing 13 and through a second controllable gear set enclosed in the same casing which in turn drives the output or driven shaft 11.

The hydraulic torque converter 12 in FIGURE 1, as shown, may be identical to that more particularly described and claimed in my co-pending application Serial No. 356,436, filed May 21, 1953 and now issued as Patent No. 2,820,373. As shown, the torque converter comprises a vaned impeller 15 directly connected to the driving shaft 10 to be driven thereby and having a set of radially elongated vanes 15' thereon. Liquid discharged radially outward from the vaned impeller 15 passes in series through a first vaned rotor or turbine 16 having vanes 16' thereon lying at the outer part of the fluid circuit and a second vaned rotor or turbine 17 having vanes 17' which extend radially inward. From the discharge end of the second turbine 17 the liquid passes through a pair of stator rings 18 and 19 having vanes 18' and 19' in series back to the inlet of the impeller. The stator rings 18 and 19 are mounted on a tubular extension 21 of the casing and are separately held against reverse rotation by one way brakes 22 engaging the respective stator rings and the extension 21.

As illustrated in FIGURE 2, the vanes 15' are substantially radial at their discharge ends so that the liquid will leave them with a forward component. The inlet ends of the vanes 16' slope forward and are preferably rounded to pick up the liquid smoothly and curve to be substantially in axial planes at their discharge ends. Under all operating conditions the liquid will strike these vanes on their rearward faces to urge the motor 16 forward and will be discharged therefrom substantially radially at stall and with a forward component under running conditions.

The vanes 17' are substantially radial at their inlet ends to receive liquid with minimum shock from the vanes 16' and then curve rearwardly. At stall or under heavy loads they will discharge liquid with a rearward component against the forward faces of the stator vanes 18' and under high speed-light load conditions may discharge the liquid radially or with a forward component.

The stator vanes 18' and 19' are curved as shown to receive liquid from the rotor vanes 17' and direct it into the vanes 15' with a forward component. At high speed-light load conditions the liquid may strike the rear faces of the vanes 18' and 19' to turn the stators forward on the one way brakes 22.

The first differential gear set enclosed within the casing part 13 includes driving sun gears 23 and 24 of different diameters, as shown. Sun gear 23 is connected through a clutch 50 and a sleeve shaft 25 with the driven rotor 17 and the sun gear 24 is mounted on a sleeve shaft 26 extending through the sleeve shaft 25. The shaft 26 is connected to the first driven rotor 16 so that the rotor 16 can turn the shaft 26 and sun gear 24 forward. A shaft 9 also preferably carries a clutch plate 28 adapted to be forced into clutching engagement with a flange 29 on the driving casing structure by hydraulic pistons 31 directly to connect the shaft 9 and a third sun gear 39 to the driving shaft 10.

The sun gears 23 and 24 are adapted to mesh drivingly with elongated planet pinions 32 mounted on a gear carrier 33 which is secured to a ring gear 37. The pinions 32 mesh directly with the larger driving pinion 23. The pinions 24 mesh with idler gears 36 which in turn mesh with the other end portions of the planet pinions 32. The planet pinions 32 also mesh with a ring gear 49 which can be held by a brake 51 for reverse drive.

In addition, to provide mechanical torque multiplication at the start a fourth sun gear 45 is preferably provided which is mounted in the casing through a one way brake 38 so that the sun gear 45 is held against reverse rotation, but is permitted to rotate forwardly. A brake 52 is preferably provided to hold the sun gear 45 against rotation in either direction when desired.

A ring gear 37 is driven by cage 33. It meshes with and imposes a turning load on elongated planet gears 40 which also mesh with sun gears 39 and 45. The planet gears 40 are mounted on a cage 42 which is directly connected to the output shaft 11. During low and intermediate speeds, sun gear 45 acts as a reactionary member for the planet gears 40 which impose a rearward torque load on sun gear 45. Said load is absorbed by one way brake 38 or brake 52 to drive cage 42 and output shaft 11 at an increased torque and reduced speed.

Attention is called to the fact that there are three reactionary or fulcrum members, to wit: the one way brakes 22 absorbing the reaction from the stator, one way brake 7 which absorbs reaction load from sun gear 23, and one way brake 38 functioning as a reactionary member for panet gears 40. Each one of these reactionary members cease to function as such as speed increases and the need for a reactionary member diminishes to nil.

Starting from the front and/or left-hand side of FIGURE 1, clutch 28 is for high speed and to give two path power flow. Clutch 50 is normally engaged for forward operation, to be released during reverse and during neutral. Brake 51 is normally disengaged, is to be engaged for reverse drive only. Brake 52 is normally disengaged, to be engaged for emergency low or for starting the engine by pushing the vehicle.

In operation, the impeller 15 is driven by the input shaft 10 and sets fluid in motion which impinges against turbine wheel 16 to drive sun gear 24 forward. Due to the planetary arrangement, reaction is set up in sun gear 23 which reacts against one way brake 7. This may produce a mechanical gear ratio in the order of 2:1 to 2½:1, as presently contemplated for cars of the day, depending on the size of the gears employed. One way brake 7 absorbs the mechanical reaction. During this time momentarily, turbine wheel 17 is stalled and stator 18 and 19 act as the hydraulic reactionary members through one way brakes 22.

As speed increases, sufficient torque is generated so that turbine wheel 17 starts to turn sun gear 23, picking up the reaction load, taking it away from one way brake 7. This may happen at any speed between 7 m.p.h. to 40 m.p.h., depending on the torque requirements and torque input. The stators 18 and 19 will remain effective to provide hydraulic torque multiplication as long as a a high torque load is present. At light torque loads the stators will overrun the brakes 22 and the torques on the turbines 16 and 17 will be the same as the input shaft torque. The combined torques on sun gears 23 and 24 differentially act to turn cage 33 which is connected to ring gear 37. Ring gear 37 acts through planet gears 40, reacting against sun gear 45.

It is presently contemplated that this mechanical gear will give a step up in torque in the order of 1¼:1 to 1½:1, depending on the size of the gears employed. In this range, the vehicle will have increased performance for passing. By engaging clutch 28, sun gear 39 becomes driven. Since sun gears 39 and 45 are the same size, sun gear 45 will revolve at the same speed as sun gear 39, thus to give a high speed cruising speed range in which the ratio of the second planetary (comprising sun gears 39 and 45) functions at a torque ratio of 1:1. At this time, a two path non-regenerative drive is provided with one mechanical path through clutch 28 and sun gear 39 and one hydraulic path through turbines 16 and 17 and gear elements 23, 24, 32, 36, 33 and 37.

Clutch 28 may be engaged or disengaged quickly and easily to produce either the performance range or cruising range since only a fraction of the total torque is transmitted thereby. One way this may be accomplished is by manipulating the acceleration pedal much in the fashion that overdrives are controlled at the present time.

When brake 52 is engaged, the transmission operates to provide resistance to descending hills. A complete neutral drive is effected by releasing clutch 50. For reverse drive the brakes 51 and 52 are engaged and clutch 50 is released. At this time sun gear 24 will be driven forward by turbine 16 and will drive ring gear 37 in reverse. Brake 52 holds sun gear 45 so that the driven shaft 11 will be driven in reverse at reduced speed and increased torque.

The transmission shown in FIGURE 3 is similar to that shown in FIGURE 1 in several respects, and identical parts are indicated by the same reference numerals, plus 100. The transmission shown in FIGURE 2 is provided with a special torque converter having three elements only and its unique feature lies in the third or stator element.

In this construction the torque converter comprising a vaned impeller 115 connected to the input shaft, a main turbine 117 receiving liquid from the impeller to be driven forward thereby, and a combined stator and auxiliary turbine 155 between the outlet of the main turbine and the inlet of the impeller. The main turbine 117 is connected through shaft 126 to the sun gear 124 which meshes directly with planet gears 132. The element 155 is connected to shaft 125 which may be connected by clutch 150 to the sun gear 123. This sun gear meshes through the idler 136 with the planet gears 132.

The main turbine has vanes curving forwardly at their inlet ends and curving rearwardly at their discharge ends as partially shown in FIGURE 5. At high torque multiplication liquid will leave rotor 117 with a rearward component as shown by the arrow $n$ in FIGURE 5. Under high speed-light load conditions liquid will leave the rotor 117 radially or with a forward component.

The element 155 is constructed to change its vane shape automatically to function efficiently as both a stator and an auxiliary turbine. For this purpose it is formed with a central fixed set of substantially radial vanes 156, a set of inlet vanes 157 pivoted at their inlet ends and a set of discharge vanes pivoted at their outlet ends. The inlet and discharge vanes are interconnected to turn simultaneously in opposite directions as, for example, by bevel gears 159.

FIGURE 5 shows the vanes of element 155 in their two positions. In the right half of this figure, the vanes are shown with their tips engaging the front faces of the fixed vanes 156 to provide a desirable contour efficiently to redirect the fluid and create the necessary reaction to act as a stator. This continues so long as the resultant flow of fluid leaving the turbine 117 has a rearward component in a direction generally indicated by the arrow $n$. After the resultant direction of fluid has changed to radial flow or to a forward component, as indicated by arrow $m$, the vanes will pivot to the position shown at the left of FIGURE 5 with their tips engaging the rear faces of vanes 156 to provide a contour such that can function efficiently as an auxiliary turbine element.

It is apparent that the action of the fluid on the pivoted vanes 156 will cause them to pivot as desired whereas the vanes 157 must be urged into their position by some other force than the action of the fluid directly thereon. It is for this purpose that the connecting means such as the bevel gears 159 is provided.

In this way, I have created a hydraulic torque converter having only three elements in which the stator element converts to become an efficient auxiliary rotor element to permit the use of the fluid device as a twin turbine torque converter in the manner described.

The advantage of having twin turbines (or an auxiliary turbine) provides means for bringing about a gear change automatically by the action of the fluid on the turbine wheels in a pleasing manner more smoothly than can be done with friction clutches. Also the timing of the change is inherently coordinated with the torque requirements by the fluid action in a very simple manner.

In operation of FIGURE 3, assume the vehicle is being started from rest with full open throttle. The input shaft 110 is being turned by the engine which turns the impeller 115. The output shaft 111 is stalled momentarily, therefore, the turbine 117 is also stalled. During this stall condition, stator turbine 155 reacts rearwardly against one way brake 122.

During this time, there are three reactionary members—the hydraulic reactionary member 155 and sun gear 123 acting through clutch 150 against one way brake 122 and sun gear 145 acting against one way brake 138 or brake 152.

As the torque increases, turbine 117 turns sun gear 124, driving cage 133 forwardly at an increased torque of (for instance) 1.5:1 due to the planetary combination comprised of 124 through 123 in which 123 is the reactionary member.

Cage 133 is directly connected to second ring gear 137 which drives cage 142, sun gear 145 being the reactionary member. Cage 142 is directly connected to the output shaft 111.

The second planetary system comprised of 139, 145 and related planet gears, may provide an increased torque in the order of 1.4:1. The first planetary system may have a mechanical advantage of 1.5:1, giving an overall advantage of 2.1:1 due to the gearing. This multiplied by a hydraulic advantage of 2.1:1 gives an overall torque ratio of 4.4:1.

As speed increases, the hydraulic torque produced by stator turbine 155 decreases, reaching zero at approximately 35 m.p.h. under certain conditions, after which there is no longer any hydraulic torque increase. However, there remains the torque increase of 2.1:1 due to the gearing. At a speed of about 45 m.p.h., there is sufficient fluid impinging on the front side of stator turbine 155 to turn it forwardly, taking the reaction load away from one way brake 122. The stator turbine now turns sun gear 123 and is called upon to produce about ⅓ of the torque output from the fluid torque converter while stator turbine 155 is driving sun gear 123. Now there remains only one reactionary member, namely, sun 145.

Torque increase is now reduced to 1.4:1 and remains there until clutch 128 is engaged. Clutch 128 may be engaged at any desired time. When the clutch is engaged, a two path power flow is created. Clutch 128 is called upon to transmit only about ¼ of the output torque which now is on the basis of 1:1; therefore, ¼ of engine torque.

It follows that the engagement of clutch 128 amounts to only ¼ the severity of a similar gear change, if made with single path gears. For this reason, this transmission may be considered almost a shiftless transmission or a 75% shiftless transmission. This applies to both FIGURES 1 and 2.

The ratios mentioned are, of course, optional, but permit the use of a 3:1 rear axle ratio, giving an overall starting torque of 13.2:1 stall fading to 4.2:1 at 45 m.p.h. The 4.2 mechanical ratio may be maintained up to near the top speeds, if desired. Clutch 128 is engaged or disengaged very much on the same basis as a driver would operate an overdrive, at his option.

While two embodiments of the invention have been shown and described herein, it will be understood that they are illustrative only and not to be taken as a definition of the scope of the invention, reference being had for this purpose to the appended claim.

This application is a continuation-in-part of my copending application Serial No. 356,436, filed May 21, 1953, now patent No. 2,820,373, granted January 21, 1958.

What is claimed is:

A transmission comprising a hydraulic torque converter including a vaned driving impeller, a first vaned turbine receiving liquid from the impeller outlet and having its vanes so curved that the liquid urges it forward under all driving conditions, a second vaned turbine receiving liquid from the outlet of the first vaned turbine and having its vanes so curved that the liquid urges it forward under all driving conditions, a vaned stator between the outlet of the second turbine and the inlet of the impeller urged rearwardly by the liquid during hydraulic torque multiplication, a differential gear set including four relatively rotatable members interconnected by gearing, means to connect one of said members to a load, means to connect two other of said members to the first and second turbines respectively, each of said last two members tending to turn the other in a reverse direction through the gearing when rotation of said one of the members is resisted and a clutch to connect the fourth of said members to the impeller.

References Cited in the file of this patent

UNITED STATES PATENTS

| | | |
|---|---|---|
| 2,271,919 | Jandasek | Feb. 3, 1942 |
| 2,291,120 | Tipton | July 28, 1942 |
| 2,312,849 | Pollard | Mar. 2, 1943 |
| 2,624,215 | McRae | Jan. 6, 1953 |
| 2,695,533 | Pollard | Nov. 30, 1954 |
| 2,803,974 | Kelley | Aug. 27, 1957 |
| 2,826,098 | Holdeman | Mar. 11, 1958 |
| 2,839,950 | Russell | June 24, 1958 |
| 2,851,906 | De Lorean | Sept. 16, 1958 |